(12) United States Patent
Spandl et al.

(10) Patent No.: US 12,162,739 B2
(45) Date of Patent: Dec. 10, 2024

(54) CLAMPING DEVICE FOR HOLDING A CONTAINER

(71) Applicant: KRONES AG, Neutraubling (DE)

(72) Inventors: Stefan Spandl, Neutraubling (DE); Bruno Landler, Neutraubling (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 18/058,499

(22) Filed: Nov. 23, 2022

(65) Prior Publication Data

US 2023/0159315 A1 May 25, 2023

(30) Foreign Application Priority Data

Nov. 25, 2021 (DE) ..................... 10 2021 131 001.6

(51) Int. Cl.
*B67C 3/24* (2006.01)
*F16B 2/10* (2006.01)
*F16B 2/18* (2006.01)

(52) U.S. Cl.
CPC ................ *B67C 3/242* (2013.01); *F16B 2/10* (2013.01); *F16B 2/18* (2013.01)

(58) Field of Classification Search
CPC ......... B67C 3/242; B67C 3/24; B67C 7/0006; B67C 2007/006; B67C 2007/0066; F16B 2/10; F16B 2/18; B65G 47/847; B65B 43/54
USPC ....................................................... 248/313
See application file for complete search history.

(56) References Cited

U.S. PATENT DOCUMENTS

| 5,711,411 | A | * | 1/1998 | Zurweller | ............... B67C 3/242 |
| | | | | | 198/470.1 |
| 5,743,377 | A | * | 4/1998 | Kronseder | ........... B65G 47/847 |
| | | | | | 198/470.1 |
| 5,893,700 | A | * | 4/1999 | Kronseder | ............. B08B 9/426 |
| | | | | | 414/744.2 |

(Continued)

FOREIGN PATENT DOCUMENTS

DE 10325137 1/2005
DE 10 2005 014 838 A1 10/2006

(Continued)

OTHER PUBLICATIONS

Extended European Search Report dated Apr. 20, 2023 from corresponding European application No. 22209632.3, 7 pages.

(Continued)

*Primary Examiner* — Muhammad Ijaz
(74) *Attorney, Agent, or Firm* — .Haynes and Boone, LLP

(57) ABSTRACT

A clamping device for holding a container in a container treatment device, for example for holding a beverage container at a neck portion, comprising two clamping arms with a holding portion for holding the container to be held, and a control cam which is pivotable about a control cam pivot axis, wherein the clamping arms and the control cam are coupled via a coupling mechanism so that a pivoting of the control cam about its control cam pivot axis causes a pivoting of the clamping arms relative to one another, and the coupling mechanism comprises at least one pair of a slotted groove and a control bolt guided in the slotted groove for transmitting movements of the control cam to the clamping arms.

20 Claims, 10 Drawing Sheets

(56) References Cited

U.S. PATENT DOCUMENTS

| | | | | |
|---|---|---|---|---|
| 6,796,342 B2* | 9/2004 | De Antoni Migliorati | | B67C 3/242 198/470.1 |
| 8,128,142 B2* | 3/2012 | Glotzl | | B65G 47/847 294/99.1 |
| 8,206,144 B2* | 6/2012 | Ng | | B29C 49/4205 425/534 |
| 8,894,114 B2* | 11/2014 | Fahldieck | | B67C 3/242 294/90 |
| 9,725,290 B2* | 8/2017 | Fahldiek | | B65G 47/847 |
| 2003/0197391 A1* | 10/2003 | Graffin | | B67C 3/242 294/104 |
| 2005/0011730 A1* | 1/2005 | Wittmann | | B65G 47/847 198/470.1 |
| 2011/0042537 A1* | 2/2011 | Fahldiek | | B67C 3/242 248/313 |
| 2011/0147166 A1* | 6/2011 | Fahldieck | | B67C 3/242 294/206 |
| 2011/0197995 A1* | 8/2011 | Bodtlander | | B67C 7/0053 141/269 |
| 2011/0203906 A1* | 8/2011 | Fahldieck | | B67C 3/242 198/803.3 |
| 2011/0308666 A1* | 12/2011 | Bodtlander | | B65G 47/847 141/165 |
| 2012/0086229 A1* | 4/2012 | Bodtlander | | B67C 3/242 294/198 |
| 2013/0193702 A1* | 8/2013 | Fahldieck | | B65G 47/847 294/199 |
| 2014/0008927 A1* | 1/2014 | Rousseau | | B25J 15/0028 294/90 |
| 2015/0314966 A1* | 11/2015 | Fahldieck | | B67C 3/242 294/199 |
| 2015/0321858 A1* | 11/2015 | Fahldieck | | B65G 47/90 294/192 |
| 2015/0336699 A1* | 11/2015 | Fahldieck | | B65B 43/46 198/803.3 |
| 2017/0334664 A1* | 11/2017 | Mallitzki | | B65G 47/847 |
| 2018/0086571 A1* | 3/2018 | Fahldieck | | B65G 47/847 |
| 2019/0176343 A1* | 6/2019 | Landler | | B25J 15/0226 |
| 2019/0322466 A1* | 10/2019 | Schulnig | | B65G 47/90 |
| 2021/0154863 A1* | 5/2021 | Landler | | B67C 3/242 |
| 2021/0206584 A1* | 7/2021 | Fahldieck | | B65G 47/847 |
| 2021/0362961 A1* | 11/2021 | Leidel | | B65G 47/847 |
| 2021/0379733 A1* | 12/2021 | Ehrismann | | B67C 3/242 |
| 2023/0159314 A1* | 5/2023 | Spandl | | B67C 3/24 248/313 |
| 2023/0159315 A1* | 5/2023 | Spandl | | B65G 47/847 248/313 |
| 2023/0339703 A1* | 10/2023 | Heinrich | | B65G 47/847 |

FOREIGN PATENT DOCUMENTS

| | | |
|---|---|---|
| DE | 10 2006 050469 A1 | 1/2008 |
| DE | 10 2012 218 204 A1 | 4/2014 |
| DE | 10 2016 123640 B3 | 3/2018 |
| DE | 10 2018 121092 A1 | 3/2020 |
| EP | 0 577 569 A1 | 1/1994 |
| EP | 0 939 044 A1 | 9/1999 |
| EP | 1 930 259 A1 | 6/2008 |
| EP | 2 143 674 A2 | 1/2010 |
| EP | 2 703 322 A1 | 3/2014 |
| WO | WO 2018/103933 | 6/2018 |

OTHER PUBLICATIONS

Chinese Office Action dated Sep. 6, 2024, from corresponding Chinese Application No. 202211490363.9, 12 pages.

* cited by examiner

CLAMPING DEVICE FOR HOLDING A CONTAINER

CROSS-REFERENCE TO RELATED APPLICATIONS

This application claims priority from German Patent Application No. DE 10 2021 131 001.6, filed on Nov. 25, 2021 in the German Patent and Trademark Office, the disclosure of which is incorporated herein by reference in its entirety.

BACKGROUND

Technical Field

The present invention concerns a clamping device for holding a container in a container treatment device, for example for holding a beverage container at a neck portion in order to fill or close this inside a beverage filling plant.

Related Art

It is known, in beverage filling plants, to transport containers to be filled or already filled through the individual treatment stations of the container treatment device by means of clamping devices. Various clamping devices are known which hold the respective containers to be treated in various ways.

For example, passive clamping devices are known which are elastically pretensioned purely by insertion of the respective container in the clamping device, and which then hold the container. DE 10 2012 218 204 A1 describes such a clamp for gripping containers. The clamp has a fixed position. In order to grip a container, the latter must be pushed into the clamp. The stiff gripper arms are here spread open, so that the container must be moved against the closing force of the gripper arms resulting from spreading of the clamp. Thus the container is exposed to a high force on insertion, so such holding devices are not suitable for gripping or holding fragile and/or easily deformable and thin-walled containers. There is at least a tendency to scratch the surfaces of the respective container, which reduces the quality of the containers.

Furthermore, active clamping devices are known in which the respective holding portions of the clamping device are actively opened and closed by means of an actuator. Such active clamping devices serve in particular to allow secure and gentle receiving of the respective containers from a preceding clamping device, or also a safe and gentle transfer of the containers to a following clamping device. In particular, the active opening and closure of the respective clamping device may avoid increased friction on the respective container, which could for example lead to scratching of the container, and secondly a predefined holding or clamping force may be set which can be maintained within a predefined tolerance range of the container dimensions. Such active clamping devices consist of a plurality of individual components, for example clamping arms, bushes, spring elements, pretension elements and corresponding connecting elements for secure connection of the above-mentioned parts. Clamping devices constructed in this way are also complicated to clean and have a correspondingly high production cost.

EP 0 939 044 A1 discloses a bottle gripper in which a gripping device is provided having two gripping arms which can be brought into a holding position or a release position by means of a control cam. The control cam cooperates with a contact face formed on each gripper arm, and the contact face is configured as part of an elastic cushion arranged on the respective gripper arm.

EP 2 143 674 A2 describes a clamping device for holding containers, in which two gripper arms or clamping arms are held in an open position by separate magnetic arrangements. The clamping arms have closing levers oriented towards the rear, which cooperate with a closing cam arranged in between in order to bring the clamping arms from the open position into a closed position.

DE 10 2005 014 838 A1 discloses an active clamping device for holding vessels, with two clamping arms which are movable relative to one another for opening and closing. In order to allow secure holding of the vessels, one gripper arm of the clamp is designed to be form-stable and the other gripper arm is form-elastic. The gripper arms are pretensioned in an open position by means of magnets arranged thereon, and are pivoted into the closed position by means of a control cam.

In clamping devices with unilateral pretension of the clamping arms in one position, wherein said arms can be moved into another position against the pretension by actuation of the control cam, and by release or automatic switching of the control cam moved back into the one pretensioned position, the process of return movement under pretension carries a degree of inertia. Accordingly, the container may be suddenly gripped and suddenly released from its holder. Furthermore, in such active clamping devices, a great deal of wear can occur between the clamping arms and control cam since the latter must always work against the unilaterally directed pretension.

SUMMARY

An improved clamping device for holding a container in a container treatment device, for example for holding a beverage container at a neck portion, is described here according to various embodiments.

Accordingly, a clamping device is proposed for holding a container in a container treatment device, for example for holding a beverage container at a neck portion, comprising two clamping arms with a holding portion for holding the container to be held, and a control cam which is pivotable about a control cam pivot axis, wherein the clamping arms and the control cam are coupled via a coupling mechanism so that a pivoting of the control cam about its control cam pivot axis causes a pivoting of the clamping arms relative to one another.

The coupling mechanism comprises at least one pair of a slotted groove and a control bolt guided in the slotted groove for transmitting movements of the control cam to the clamping arms.

In other words, the clamping arms and the control cam are coupled via at least one slotted groove and a control bolt assigned to the slotted groove and guided in the slotted groove for transmitting movements of the control cam to the clamping arms, so that a pivoting of the control cam about its control cam pivot axis causes a pivoting of the clamping arms relative to one another. The above-described coupling may be regarded as a coupling mechanism.

Because the coupling mechanism comprises at least one pair of a slotted groove and a control bolt guided in the slotted groove for transmitting movements of the control cam to the clamping arms, a permanent or persistent forced guidance of at least one clamping arm by the control cam can be provided. In other words, because of the coupling (provided by the coupling mechanism), the position and a movement of the clamping arms are always predefined by the position and movement of the control cam.

Accordingly, it can be prevented that, on a switching pulse to the control cam generating an abrupt movement of the control cam, the clamping arms and control cam briefly come out of engagement or lose contact with one another, as may be the case with unilaterally pretensioned conventional clamping devices, such as if the spring force of the unilateral pretension is not sufficient, and then hit one another again. The gripping and release of the container to be held by the clamping device may thus take place comparatively gently without any uncontrolled impacts occurring on opening or closing of the clamping arms.

Furthermore, because of the permanent guidance provided by the pair of slotted groove and control bolt, a defined contact of the holding portions on the container to be held may be achieved.

A clamping device configured in this fashion may accordingly, in comparison with conventional devices, be subjected to particularly low wear during operation, in particular in regions in which the clamping arms and control cam are coupled, which in turn has a positive effect on the service life of the components of the clamping device.

With a container treatment device having the clamping device, in comparison with container treatment devices with conventional clamping devices, the service intervals may be extended because of the reduced wear.

Furthermore, because of the constantly force-guided movement of the holding portions and the reduction, in comparison with conventional clamping devices, or even avoidance of the occurrence of impacts during opening and/or closing of the clamping arms, controlled by the control cam, damage of the container to be held and/or the escape of product present in the container, such as a beverage, with associated contamination of the clamping device and other regions of a container treatment device with the clamping device or the outside of the container, may be reduced or even avoided.

The expression "pivot axis" means a geometric axis representing a rotational centre point, and in this document describes in particular a fixed pivot axis, i.e. an axis arranged stationarily with respect to the clamping device. The term "pivot axis" does not therefore mean a floating axis in the sense of a momentary pole. A body moving simultaneously rotationally and translationally in a plane does not pivot about a fixed axis; accordingly it has no pivot axis as understood here.

The geometric pivot axis may evidently be provided or configured in the form of a mechanical axle or shaft in the known fashion. For example, an axle journal, a pin or a bolt may be arranged on a carrier plate of the clamping device, on which for example a clamping arm is pivotably mounted in the sense of a shaft-hub connection. Furthermore, the control cam may for example comprise a shaft portion which is rotatably mounted in a bore in the carrier plate.

A "slotted groove" here means a groove which has substantially the form of a slot, and extends in a longitudinal extent from a first end to a second end, and between the two ends has side walls running substantially parallel to one another, or in other words transversely to the longitudinal extent at a fixed distance from one another, for example running straight or having an infinite radius of curvature.

The longitudinal extent of the slotted groove is here related to a plane oriented perpendicularly to the control cam pivot axis. In other words, the slot shape of the slotted groove is evident viewed in the direction of the control cam pivot axis.

The slotted groove in the sense of a groove extends as a depression in a body with the above-described slot shape, in the direction of the control cam pivot axis, with a predefined depth and/or at least partially through the entire body.

According to a one embodiment, the holding portions can be moved into an open position and/or a closed position by the pivoting of the control cam.

Furthermore, alternatively or additionally, the clamping arms may be arranged pivotably in a plane oriented perpendicularly to the control cam pivot axis.

In various embodiments, the clamping arms are pivotable about at least one axis oriented parallel to the control cam pivot axis, wherein in some embodiments each clamping arm has a respective pivot axis about which it is pivotable.

A particularly compact structure and also a favourable force distribution with respect to the forces introduced by the control cam and a force exerted by the holding portions on the container held therein, and with respect to a ratio in relation to a movement scope of the control cam relative to the movement scope of the holding portions, can be achieved if the holding portions are arranged on one side of the clamping arms, and in some embodiments with respect to the at least one pivot axis, and the at least one pair of slotted groove and control bolt is arranged on the other side.

According to a further embodiment, the at least one slotted groove is arranged on the clamping arm side and the at least one control bolt is arranged on the control cam. In other words, at least one of the clamping arms may comprise a slotted groove in which the control bolt assigned to said slotted groove and arranged on the control cam is guided.

Alternatively or additionally, at least one control bolt may be arranged on the clamping arm side and the at least one slotted groove assigned to said control bolt is arranged on the control cam. In other words, at least one of the clamping arms may comprise a control bolt which is guided in the slotted groove assigned to said control bolt and arranged on the control cam.

According to a further embodiment, the coupling mechanism comprises two pairs of slotted groove and control bolt, wherein each pair of slotted groove and control bolt couples a respective clamping arm to the control cam.

Alternatively, the coupling mechanism may comprises precisely one pair of slotted groove and control bolt, wherein the pair of slotted groove and control bolt couples one of the clamping arms to the control cam and this clamping arm is rotationally coupled to the other clamping arm, and in certain embodiments via a gear mechanism, for example a toothed gear mechanism.

In other words, the coupling mechanism according to the above embodiment comprises the precisely one pair of slotted groove and control bolt, for moving the first clamping arm via a movement of the control cam, and furthermore the coupling mechanism comprises a rotational coupling unit for coupling the first clamping arm to the second clamping arm, which is not itself directly coupled to the control bolt. The rotational coupling unit is in several embodiments formed as a gear mechanism, for example a toothed gear mechanism. Accordingly, the control cam is coupled directly to one clamping arm via the pair of slotted groove and control bolt, and coupled indirectly to the other clamping arm via the directly coupled clamping arm and the rotational coupling unit.

Advantageously, both clamping arms have a toothing portion in the form of a gear wheel which is arranged substantially concentrically to the pivot axis of the respective clamping arm and extends perpendicularly thereto. The toothing portions are in engagement with one another, thereby forming the rotational coupling between the clamping arms.

It has proved advantageous to arrange at least one control bolt eccentrically relative to the control cam pivot axis.

Since the at least one control bolt is arranged eccentrically relative to the control cam pivot axis, said elements are not concentric to one another. Rather, the control cam pivot axis and the at least one control bolt, in particular a longitudinal centre axis of the control bolt, have a distance from one another in a plane oriented perpendicularly to the control cam pivot axis. The distance may be a variable distance, for example if the at least one control bolt is arranged on the clamping arm side, in other words on one of the clamping arms, or in yet other words if one of the clamping arms comprises the control bolt.

According to a further embodiment, a first slotted groove is arranged on a first clamping arm and has a first distance from the pivot axis of the first clamping arm, and furthermore a second slotted groove is arranged on the second clamping arm and has a second distance from the pivot axis of the second clamping arm. In one or more embodiments, the amount of the second distance is greater than the amount of the first distance, and furthermore in various embodiments, a first control bolt guided in the first slotted groove is arranged on the control cam with a first distance the control cam pivot axis, and a second control bolt guided in the second slotted groove is arranged on the control cam with a second distance from the control cam pivot axis, the amount of which distance is greater than that of the first distance. Thus a particularly compact construction of the clamping device may be achieved.

The above-mentioned distances are in several embodiments selected such that the translational ratio provided by the first pair of the first slotted groove and first control bolt corresponds substantially to the translational ratio provided by the second pair of second slotted groove and second control bolt. Then a symmetrical pivoting of the two clamping arms may be achieved.

According to a further embodiment, at least one slotted groove is at least partially formed as a continuous bore, and/or at least one slotted groove is at least partially formed as a blind hole bore, and/or at least one slotted groove is formed open at one end, and/or at least one slotted groove is formed open at both ends.

According to a further embodiment, the at least one control bolt comprises a portion which is curved, in one embodiment an arcuate portion, relative to a longitudinal centre axis of the control bolt. The control bolt can then carry out a rotational movement in the slotted groove relative thereto, or slide and/or roll on the wall of the slotted groove.

Alternatively or in addition, at least one control bolt may have a cam portion which extends in a plane oriented perpendicularly to the control cam pivot axis. Because of the cam portion, a rotational movement of the control bolt relative to the slotted groove may be restricted in its scope to a predefined amount. For example, the control cam may function as a stop for a side wall of the slotted groove.

A particularly low-wear operation of the clamping device may be achieved if the clamping arms, the control cam and the coupling mechanism are configured such that by pivoting of the control cam between a predefined open position and a predefined closed position, the holding portions can be moved, by pivoting of the clamping arms relative to one another, into an open position and/or a closed position, wherein the control cam can be moved between the predefined open position and the predefined closed position, relative to a plane perpendicular to the control cam pivot axis, in some embodiments by a predefined pivot angle, wherein the predefined pivot angle lies in a range between 40° and 55° for example between 44° and 50° and in another example is substantially 45°, 46°, 47° or 48°.

According to a further embodiment, the clamping device comprises a pretension device which is configured to pretension the control cam into at least one predefined end position which in some embodiments corresponds to the predefined open position and/or the predefined closed position.

In certain embodiments, the pretension device comprises at least one spring element arranged on the control cam, and at least one running roller in contact with the spring element, wherein the spring element pretensions the running roller in several embodiments into the at least one end position.

According to a further embodiment, the spring element has a curvature relative to the control cam pivot axis which is greater than a curvature of the geometric pitch circle, arranged concentrically to the control cam pivot axis, at the level of the spring element.

Alternatively, the control cam may have a web extending radially outward relative to a geometric pitch circle present concentrically to the control cam pivot axis, from which web a spring element extends tangentially to the radial direction relative to the control cam pivot axis, for example one spring element on each side of the web. With such a structure, the pretension provided by the spring element on the running roller may be greatest in the at least one end position.

According to a further embodiment, the at least one spring element is configured as a curved leaf spring, in the form of a bolt spring-mounted radially relative to the control cam pivot axis or in the form of a bending bar with a free end.

According to a further embodiment, the running roller is mounted on the bearing bolt, eccentrically to a bearing centre axis of a bearing bolt arranged rotationally fixedly on a carrier plate, wherein in various embodiments the orientation of the bearing bolt about its bearing centre axis can be changed. Thus the amount of a pretension present between the running roller and spring element may be adjusted. By adjusting the running roller in the direction of the control cam pivot axis, the pretension force may be increased, and by moving it in the other direction, said force may be reduced correspondingly.

Additionally or alternatively, the running roller may be pretensioned onto the control cam in the radial direction with respect to the control cam pivot axis. For example, the running roller may be spring-mounted in the direction of the control cam, for example via a torsion spring.

According to a further embodiment, the pretension device is configured as a magnetic pretension device, wherein in one or more embodiments a stop arranged on a carrier plate has a magnet or a magnetisable and/or ferromagnetic material which cooperates with at least one magnetic element or magnetisable and/or ferromagnetic material provided in various embodiments on the control cam, on an arm which extends radially outward relative to the control cam pivot axis, such that because of a magnetic attraction force between said elements, the control cam is held in at least one end position.

According to a further embodiment, viewed in the direction of the control cam pivot axis, at an end face, the control bolt has a locking web for holding the control cam on at least one clamping arm, wherein the locking web is in one embodiments formed as a circular flange which is in some embodiments arranged concentrically to the longitudinal centre axis of the control bolt, and the extent of which perpendicularly to the control cam pivot axis, for example its outer diameter, is greater than a width of the slotted groove assigned to the control bolt transversely to its longitudinal extent, and/or which is formed as a connecting web between the two control bolts.

A sliding plate may be provided between a carrier plate of the clamping device on which the clamping arms and/or the control cam are mounted, and the clamping arms, for providing a slide bearing between the carrier plate and clamping arms.

Alternatively or additionally, on a side of the clamping arms by which they may be attached to the container transport device of a container treatment device, in some embodiments a top side of the clamping arms, a sliding plate may be provided in order to provide a slide bearing of the clamping arms relative to the container transport device on which the clamping device may be arranged.

The clamping arms and/or the carrier plate may be made of a metal, for example a steel alloy. In one or more embodiments, the sliding plate is made from a material different from the carrier plate and/or the clamping arms, or coated with such a material, for example a plastic, a copper alloy or a brass alloy.

BRIEF DESCRIPTION OF THE FIGURES

Further embodiments of the invention are explained in more detail by way of the description of the figures that follows.

DETAILED DESCRIPTION

Exemplary embodiments are described below with reference to the figures. In this case, elements that are identical, similar or have the same effect are provided with identical reference signs in the various figures and a repeated description of these elements is partly omitted in order to prevent redundancies.

Figure 1:
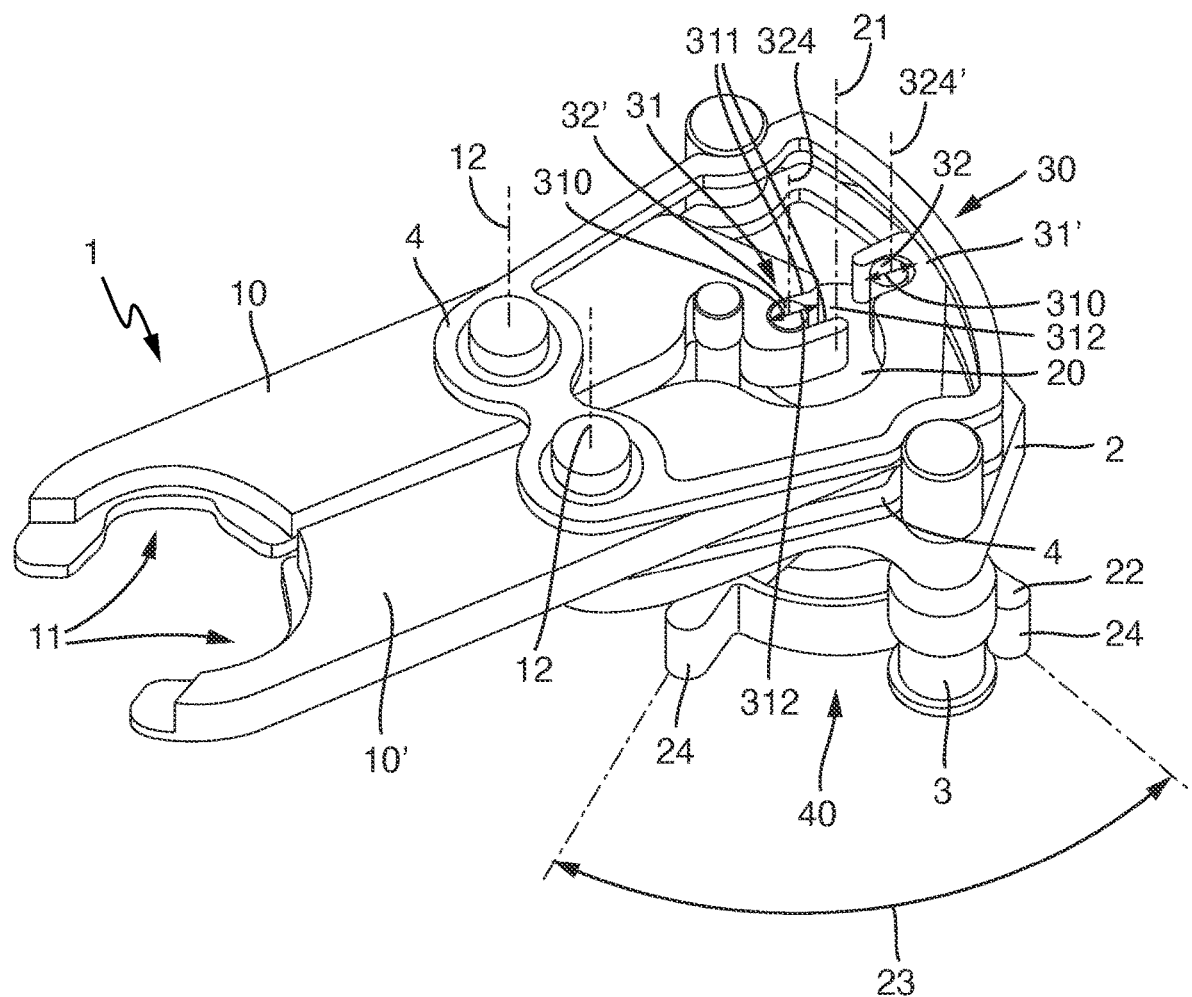
FIG. 1 shows schematically a perspective side view of a clamping device for holding a beverage container at a neck portion.

FIG. 1 shows schematically a perspective side view of a clamping device 1 for holding a beverage container at a neck portion. The clamping device comprises two clamping arms 10, 10' with a holding portion 11 for holding the container to be held. The holding portion 11 is configured for example to grip a container to be held below a neck ring of the container. The clamping arms 10, 10' are arranged on a carrier plate 2 so as to be pivotable about a respective pivot axis 12 for opening and closing. The pivot axes 12 are oriented parallel to one another.

The clamping device 1 furthermore comprises a control cam 20 which is pivotable about a control cam pivot axis 21 oriented parallel to the pivot axes 12. To predefine the position of the holding portions 11 of the clamping arms 10, 10', the clamping arms 10, 10' and the control cam 20 are coupled via a coupling mechanism 30. Accordingly, a pivoting of the control cam 20 about its control cam pivot axis 21 causes a pivoting of the clamping arms 10 about their pivot axes 12, so that the holding portions 11 can be moved relative to one another, towards one another or away from one another, in order to open and close the clamping device 1. In other words, the relative movement of the holding portions 11 is controlled by the control cam 20.

In the present case, the coupling mechanism 30 comprises two pairs of a respective slotted groove 31, 31' and a control bolt 32, 32' guided in the slotted groove 31, 31', wherein a respective pair of slotted groove 31, 31' and control bolt 32, 32' couples a clamping arm 10, 10' to the control cam 20.

In the present case, this coupling is provided in that each clamping arm 10, 10' has a slotted groove 31, 31', in which the control bolt 32, 32' assigned to said slotted groove 31, 31' and arranged on the control cam 20 is guided.

The "guiding" of the control bolt 32, 32' in the assigned slotted groove 31, 31' is configured such that the control bolt 32, 32' can move translationally relative to the slotted groove 31, 31' in a plane extending parallel to the control cam pivot axis 21, and can roll and/or slide along the side walls of the slotted groove 31, 31', or also move rotationally relative to the slotted groove 31, 31'.

The slotted grooves 31, 31' each extend completely through the clamping arm 10, 10' in the direction of the control cam pivot axis 21. They may also be regarded as continuous holes in slot form.

Viewed in the direction of the control cam pivot axis 21, the slotted grooves 31, 31' each have substantially the form of a slot. Accordingly, in a longitudinal extent 310, they extend from a first end 312 to a second end 312, with side walls 311 running substantially parallel to one another between the two ends 312.

In the present case, the slotted grooves 31, 31' are each formed open at one end. In other words, one of the two ends 312 is an open end. In the present case, the open end 312 of each slotted groove 31, 31' is the end 312 lying closer to the control cam pivot axis 21.

In order to be able to change the position of the control cam 20 when installed on a container transport device of a container treatment device, said control cam has an interaction part 22 which extends radially outward relative to the control cam pivot axis 21, and on which for example an interaction bolt, provided at a fixed position of the container treatment device, can stop and thus cause a pivoting of the control cam 20.

In order to limit the scope of movement of the control cam 20 about the control cam pivot axis 21, the clamping device 1 furthermore comprises an optional stop 3 which is arranged on the carrier plate 2 and which, viewed in the circumferential direction relative to the control cam pivot axis 21, is arranged between two radially outwardly extending arms 24 of the control cam 20. Thus the control cam 20 can pivot about the control cam pivot axis 21 only through an angle 23 delimited by the arms 24, in the present case 45°. The end positions of the control cam, at which one of the arms 24 of the control cam 21 lies on the stop 3, here constitute predefined positions with respect to the open and closed positions of the holding portions 11. One end position accordingly constitutes a predefined open position, and the other end position constitutes a predefined closed position.

The holding portions 11 may accordingly be moved by pivoting of the control cam 20 between a closed position predefined by the predefined closed position, shown in FIG. 1, and an open position predefined by the predefined open position.

The clamping device 1 furthermore comprises a holding device for holding the control cam 21 in a predefined position, in the predefined closed position or predefined open position, as will be explained in more detail below.

The arms 24 and the control bolts 32, 32' are configured such that a lever arm ratio between a lever arm present between the control cam pivot axis 21 and a predefined attack point for an interaction element of the container handling device for switching the control cam 20, and the lever arm present between the control bolts 32, 32' and control cam pivot axis 21, lies substantially between 5:1 and 3:1, and is in one embodiment substantially 4:1. The term "substantially" here means that differences resulting from the different distances 320, 320' lie within the rounding or tolerance of the lever arm ratio. In other words, the difference between distances 320, 320' is sufficiently small that the resulting differences from the above-described lever arms may be ignored.

A sliding plate 4 is provided between the carrier plate 2 and the clamping arms 10, and provides a slide bearing of the clamping arms 10 relative to the carrier plate 2.

Furthermore, a sliding plate 4 is provided above the clamping arms 10 and provides a slide bearing of the clamping arms 10 relative to a container transport device on which the clamping device 1 may be arranged.

The clamping arms 10 and/or the carrier plate 2 may be made of a metal, for example a steel alloy. In some embodiments, the sliding plates 4 are made from a material different from the carrier plate 2 and/or the clamping arms 10, for example a plastic, a copper alloy or a brass alloy.

Figure 2:
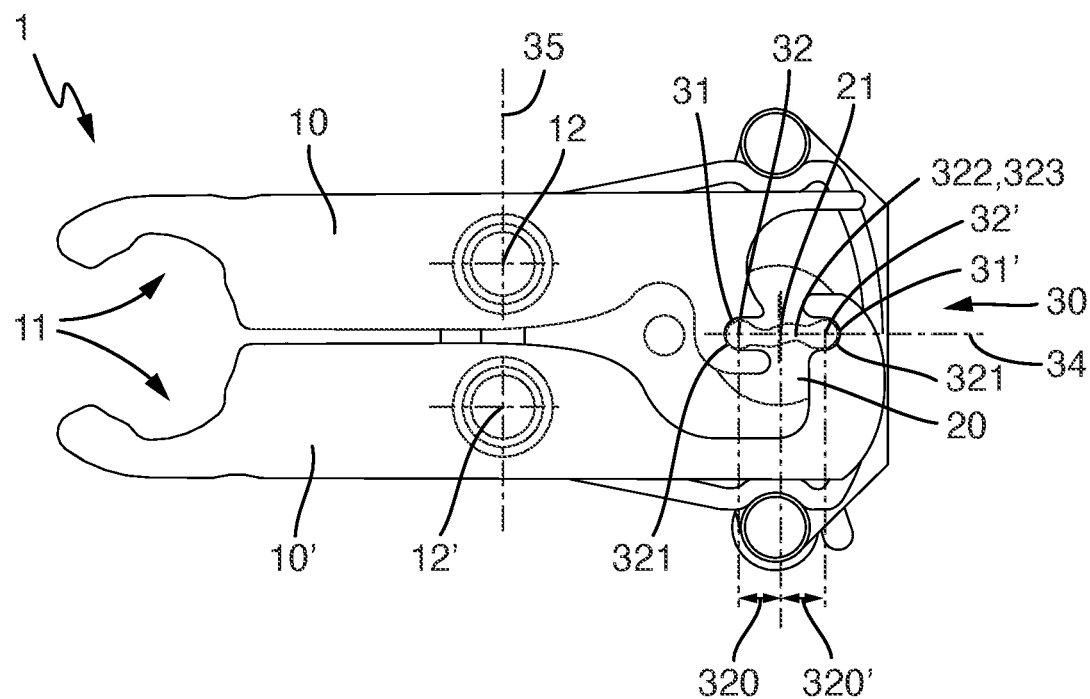
FIG. 2 shows schematically a top view of a clamping device according to a further embodiment, in a closed position.

FIG. 2 shows schematically a top view of a clamping device 1 according to a further embodiment. The clamping device 1 shown in FIG. 2 nonetheless substantially corresponds to that of FIG. 1.

In particular, a common factor of the embodiments of FIGS. 1 and 2 is that the clamping arms 10, 10' are not formed symmetrically, in particular with respect to the region around the slotted grooves 31, 31'. Thus a particularly compact construction of the clamping device 1 may be achieved. In this respect, the slotted groove 31 arranged on the clamping arm 10 has a first distance from the pivot axis 12 of the clamping arm 10, and the slotted groove 31' arranged on the clamping arm 10' has a second distance from the pivot axis 12' of the clamping arm 10', wherein the amount of the second distance is greater than the amount of the first distance. The distances correspond to the length of the lever arms.

So that on pivoting of the control cam 20, the two clamping arms 10, 10' each pivot through the same angle about their respective pivot axis 12, 12', or in other words pivot symmetrically relative to one another, the control bolt 32 guided in the slotted groove 10 is arranged on the control cam 20 at a first distance 320 from the control cam pivot axis 21 which is smaller than the distance of the second control bolt 32' guided in the slotted groove 31' from the control cam pivot axis 21. The above-mentioned distances are selected such that the translational ratio provided by the first pair of the slotted groove 31 and control bolt 32 corresponds substantially to the translational ratio provided by the pair of slotted groove 31' and control bolt 32'.

In the closed position of the holding portions 11 shown in FIGS. 1 and 2 respectively, the control cam 20 is present in the predefined closed position. The control bolts 32, 32' are here arranged on the control cam 20 such that in the predefined closed position of the control cam 20, viewed in the direction of the control cam pivot axis 21, they lie on a line which is oriented perpendicularly to a plane 35 formed by the two pivot axes 12, 12'.

In contrast to the embodiment of FIG. 1, in the embodiment of FIG. 2, the control bolts 32' are connected by a connecting wall 324, which may be understood as two interconnected cam portions 322. Firstly, in addition or alternatively to the optional stop 3 (see FIG. 1), the movement of the control cam 20 about the control cam pivot axis 21 may thereby be limited. Since the control bolts 32, 32' are connected via the connecting wall 324, with respect to the control cam pivot axis 21, they have an increased bending stiffness in the radial direction in comparison with the embodiment of FIG. 1.

Figure 3:
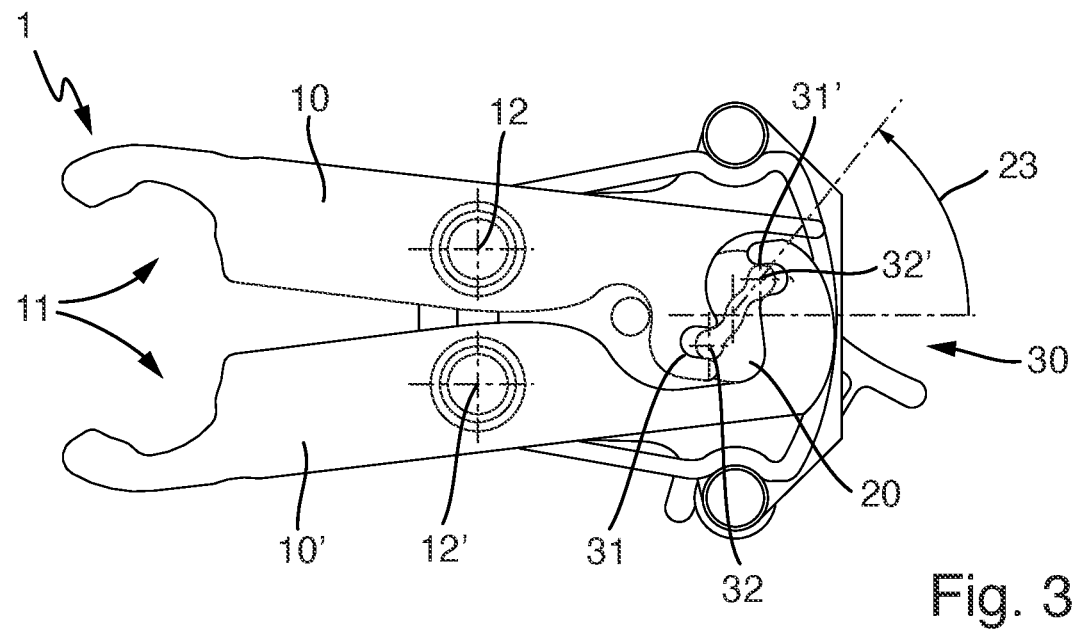
FIG. 3 shows schematically a top view of a clamping device from FIG. 2 in an open position.

FIG. 3 shows schematically a top view of the clamping device 1 from FIG. 2 in an open position in which the holding portions 11 are in their open position. Accordingly, the control cam 20 is pivoted through the predefined angle 23, in this case 45°, relative to its orientation in FIG. 2. Via the coupling of the control cam 20 to the clamping arms 10, 10', which is provided by means of the above-described coupling mechanism 30 and which may be regarded as the forced guidance of the coupling arms 10, 10' by the control cam 20, accordingly the coupling arms 10, 10' are also pivoted about their pivot axes 12, 12'.

On pivoting of the control cam 20 between the predefined open position and the predefined closed position, the control bolts 32, 32' move along their assigned slotted grooves 31, 31'. Viewed relative to the slotted grooves 31, 31', this movement of the control bolts 32, 32' constitutes a translational movement component along the longitudinal extent 310 of the slotted grooves 31, 31' and a rotational movement component or a slide movement relative to the side walls 311 of the slotted grooves 31, 31'.

In order to allow the latter rotational movement component, the control bolts 32, 32' have a portion which is curved relative to the respective longitudinal centre axis 325, in this case in the form of an arcuate portion 321. In contrast to the embodiment of FIG. 1, in which the arcuate portion 321 runs over the entire circumference of the cylindrical control bolts 32, 32', the arcuate portion 321 in the embodiment of FIGS. 2 and 3 is delimited by the connecting wall 324.

Figure 4:
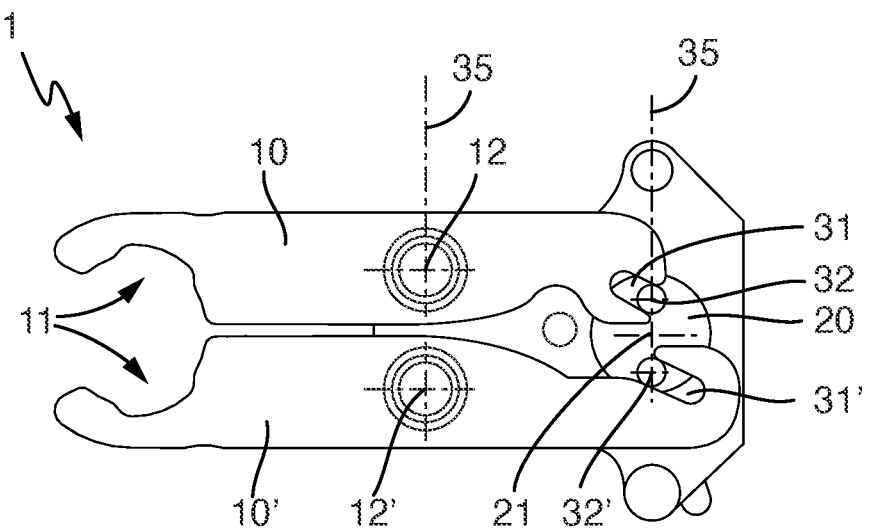
FIG. 4 shows schematically a top view of a clamping device according to a further embodiment, in a closed position.
Figure 5:
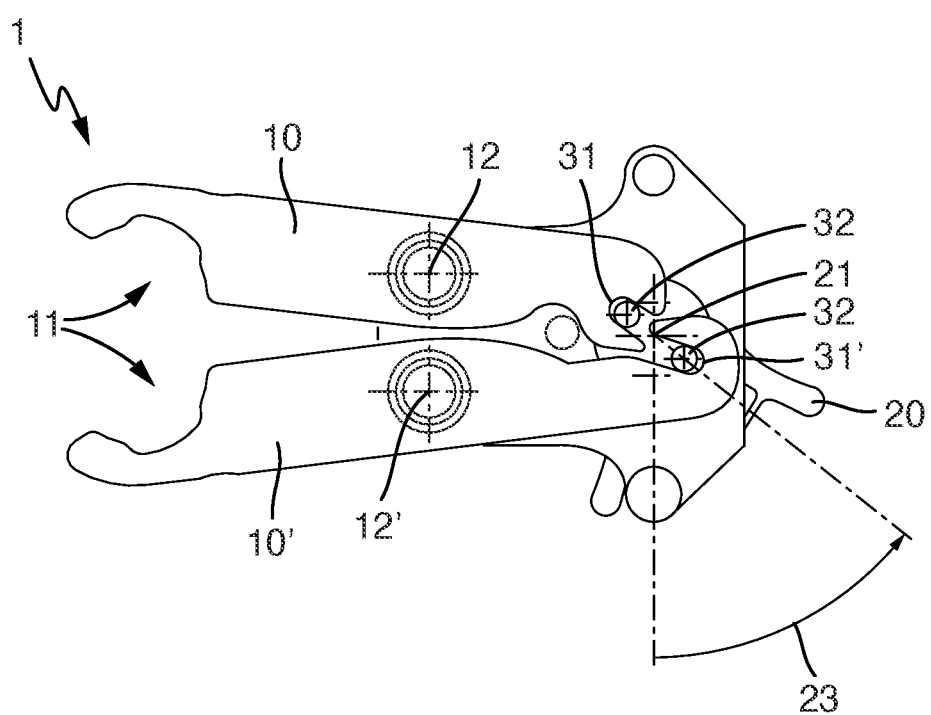
FIG. 5 shows schematically a top view of a clamping device from FIG. 4 in an open position.

FIGS. 4 and 5 each show schematically a top view of a clamping device 1 according to a further embodiment, in a closed position (FIG. 4) and an open position (FIG. 5). The clamping device 1 substantially corresponds to the clamping device 1 from FIG. 1.

In contrast to the clamping devices 1 from FIG. 1 and FIGS. 2 and 3, the clamping device 1 in FIGS. 4 and 5 has a structure such that in the closed position of the clamping device 1, or when the holding portions 11 are in their closed position and accordingly the control cam 20 is in the predefined closed position, the control bolts 32, 32', viewed perpendicularly to the control cam pivot axis 21, lie on a line 34 which lies substantially parallel to the plane 35 formed by the pivot axes 12, 12'. In this embodiment, the holding portions 11 can particularly effectively be prevented from opening under a pivoting of the clamping arms 10, 10' about their pivot axes 12, 12' by a pressure against the holding portions 11, for example because of a sudden impact on a container held in the clamping device 1.

Figure 6:
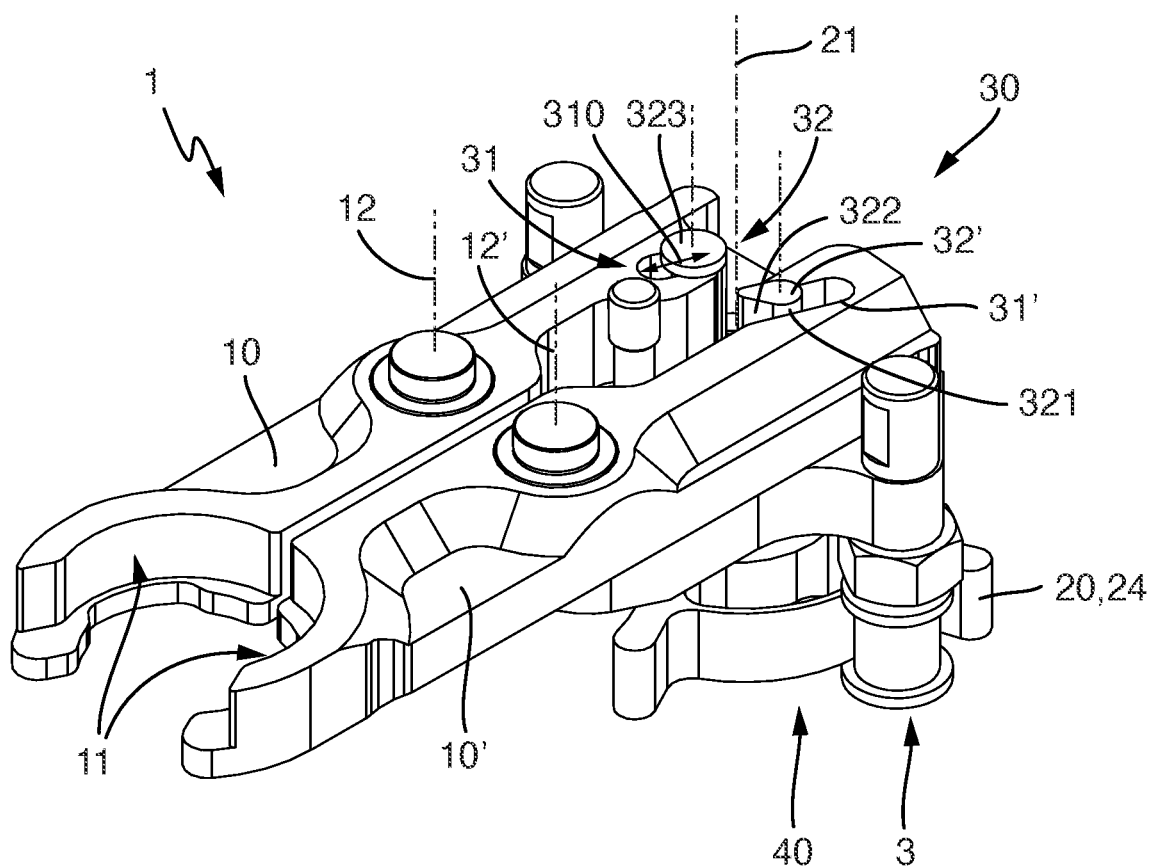
FIG. 6 shows schematically a perspective side view of a clamping device according to a further embodiment.

FIG. 6 shows schematically a perspective side view of a clamping device 1 according to a further embodiment, which substantially corresponds to that of FIG. 1.

In the clamping device 1 according to FIG. 6, in contrast to the embodiment of FIG. 1, the control bolt 32' has a cam portion 322.

At its end face viewed in the direction of the control cam pivot axis 21, the control bolt 32 has a locking web 323, in this case formed by a circular flange which is arranged concentrically to the longitudinal centre axis 325 of the control bolt 32, and the outer diameter of which is greater than the width of the slotted groove 31 transversely to its longitudinal extent 310. Thus in the direction of the control cam pivot axis 21, a form fit is created between the clamping arm 10 and the control cam 20 so that in the state shown in FIG. 6, not arranged on a container transport device, the control cam 20 is held on the clamping arm 10.

Figure 7:
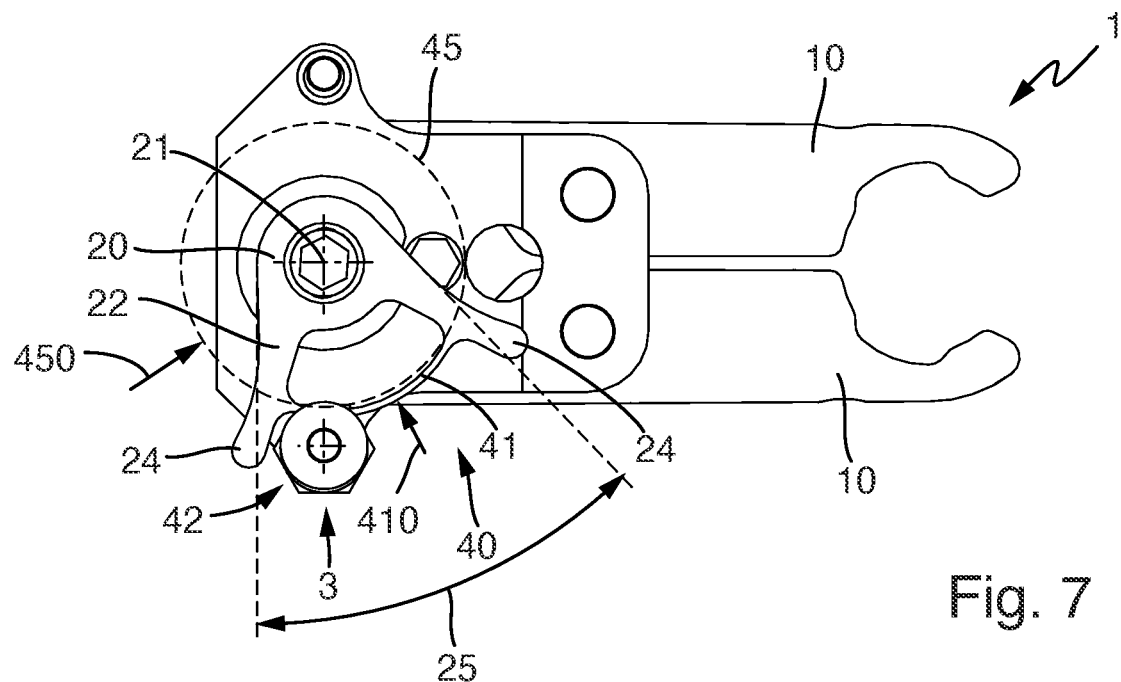
FIG. 7 shows schematically a view from below of the clamping device from FIG. 1.
Figure 8:
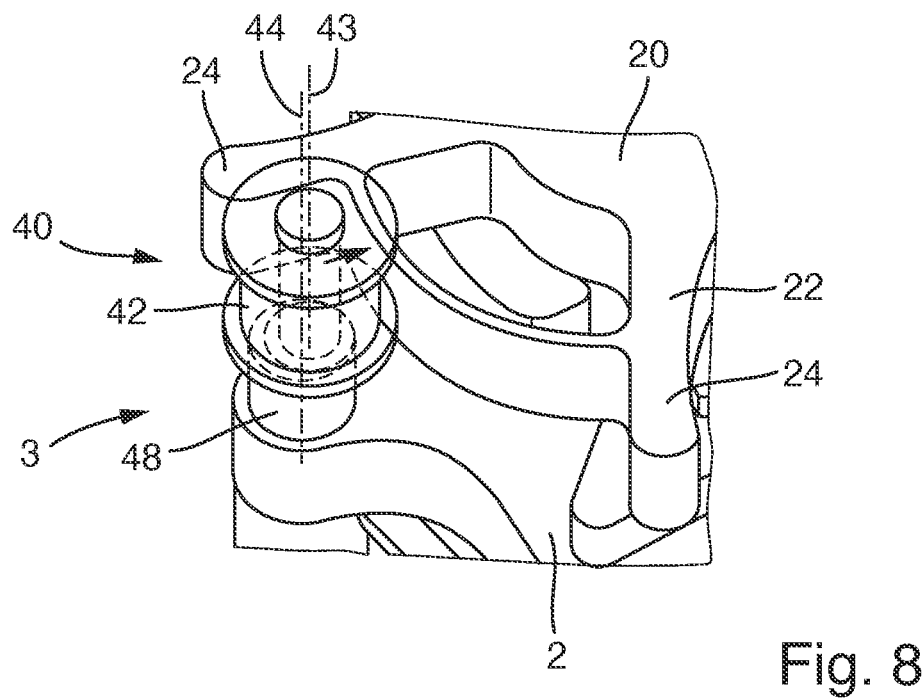
FIG. 8 shows schematically a perspective side view from below of a part region of the clamping device from FIG. 1.

With reference to FIGS. 7 and 8, the pretension device 40 which is common to FIGS. 1 to 6 is now described in more detail.

FIG. 7 shows schematically a view from below of the clamping device 1 from FIG. 1, and FIG. 8 shows schematically a perspective side view from below of a part region of the clamping device 1 from FIG. 1.

The pretension device 40 is configured to hold or pretension the control cam 20 in a predefined end position, either the predefined open position or the predefined closed position.

In the embodiment as common to the clamping devices 1 from FIGS. 1 to 8, the pretension device 40 comprises a spring element 41 arranged on the control cam 20, in the present case a curved leaf spring, which extends between the arms 24 substantially in the circumferential direction relative to the control cam pivot axis. As shown in FIG. 7, on its side pointing towards the running roller 42, the spring element 41 has a curvature, indicated by the curvature radius 410, which is greater than a curvature, indicated by the radius 450, of a geometric pitch circle 45 present concentrically to the control cam pivot axis 21, at the level of the connecting points of the spring element 41 to the arms 24 of the interaction part 22.

As evident in particular from FIG. 8, the stop 3 is formed by a running roller 42 which is mounted rotatably on the carrier plate 2 via a bearing bolt 48, and which is in contact with or rolls over the spring element 41, limited by the arms 24 providing the end positions.

Since the spring element 41 curves radially outward relative to the pitch circle diameter 45 with respect to the control cam pivot axis 21, because of the smaller curvature radius 410 in comparison with radius 450, the spring element 41 exerts a spring force on the running roller 42 which is at its largest in the middle of the spring element 41, and thereby pretensions the running roller 42 into the respective end position. Because of this pretension, the control cam 20 and accordingly the clamping arms 10 are in a stable state, namely either in the open position or in the closed position.

In order to move the clamping arms 10 out of the respective position, the control cam 20 must be moved against the tension provided by the spring element 41. In other words, the force occurring from the spring force of the spring element 41 generated during rolling of the running roller 42 over the spring element 41 because of the resulting elastic bending, must be overcome in order to allow a relative movement of the running roller 42 and control cam 20. When the apex or middle of the spring element 41 is passed, the spring force provided by the spring element 41 because of its bend supports the movement of the control cam 20 into the respective end position.

Reference symbol 25 indicates the extent angle of the interaction portion 22 or the arms 24 in the circumferential direction relative to the control cam pivot axis 21, which angle in this case is 45°.

As shown in FIG. 8, the running roller 42 is mounted on the bearing bolt 48 eccentrically to a bearing bolt 48 arranged rotationally fixedly on the carrier plate 2. Accordingly, the rotational axis 43 of the running roller 42 has a predefined distance from the bearing centre axis 44 of the bearing bolt 48.

By twisting the orientation of the bearing bolt 48 about its longitudinal centre axis 44, a pretension force provided by the spring element 41 can be changed. Accordingly, thus also a holding force of the clamping arms in the respective end position, here the closed position, when the control cam 20 is in the predefined closed position, can be adjusted.

In an alternative embodiment, the bearing bolt 48 may be pretensioned in the circumferential direction relative to the bearing centre axis 44, such that the running roller 42 is pressed in the radial direction relative to the control cam pivot axis 21 onto the control cam 20, in some embodiments in that a torsion spring (not shown here) is provided between the carrier plate 2 and the bearing bolt 48.

If, in this embodiment, the spring element 41 is also provided, the pretension force which holds the control cam 20 in one of the end positions consists of the spring force of the running roller 42 together with the spring force of the spring element 41.

Alternatively, with such a sprung mounting of the running roller 42, which is rotationally mounted eccentrically to the bearing centre axis 44, instead of the elastic spring element 41, a rigid element may be provided which, like the spring element 41, has a curvature greater than that of the pitch circle 45. Then the pretension force for holding the control cam 20 in one of the end positions is provided solely by the spring element (not shown) on the side of the running roller 42.

The shape of the arms 24 and the position of the running roller 42 are predefined such that a lever arm ratio between a lever arm present between the control cam pivot axis 21 and the contact region of the running roller 42 on the arms 24, and the lever arms present between the control bolts 32, 32' and the control cam pivot axis 21, lies substantially between 6:1 and 2:1, and is in some embodiments substantially 5:1, 4:1 or 3:1. The term "substantially" here means that differences resulting from the different distances 320, 320' lie within the rounding or tolerance of the lever arm ratio. In other words, the difference between distances 320, 320' is sufficiently small that the resulting differences from the prescribed lever arms may be ignored.

Figure 9:
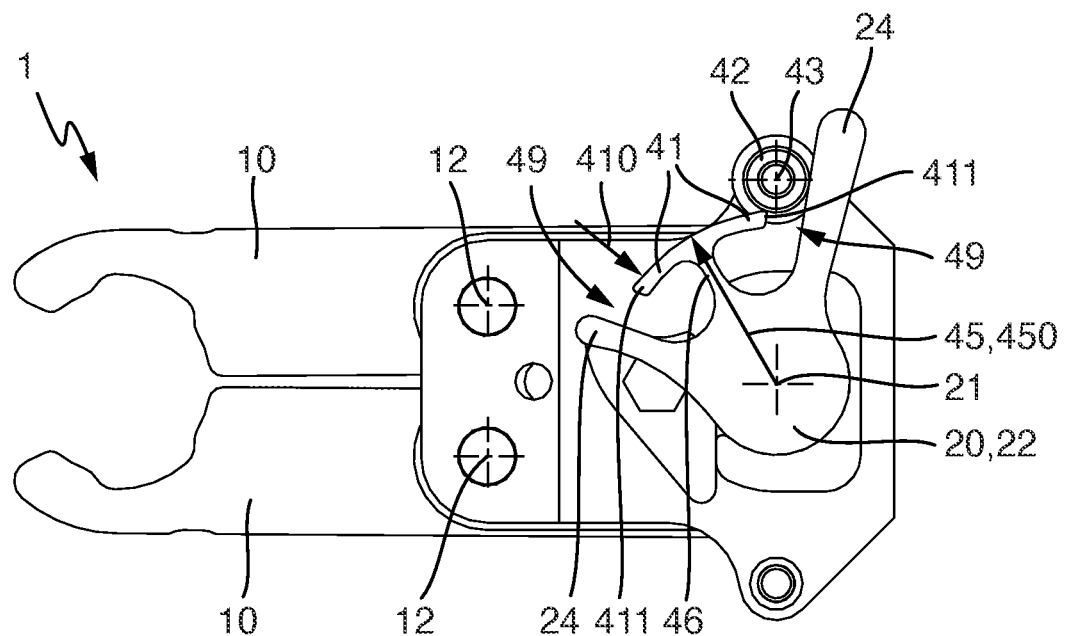
FIG. 9 shows schematically a view from below of a clamping device according to a further embodiment.

FIG. 9 shows schematically a view from below of a clamping device 1 according to a further embodiment. The clamping device 1 substantially corresponds to that of FIG. 8 with the exception of the embodiment of the pretension device 40. Instead of the continuous leaf spring which is attached to or transforms into the arms 24 at both ends, in this embodiment, the control cam 20 comprises a web 46 extending substantially centrally between the arms 24 radially outwardly to the pitch circle 45, and a spring element 41 which extends at the radially outer end of said web on each side, substantially in the circumferential direction or tangentially thereto with respect to the control cam pivot axis 21, in the form of a bending bar with a free end, wherein the free end in each case ends at a predefined distance from the respective arm 24.

The spring element 41 have a curvature which is smaller than the curvature of the pitch circle 45. In other words, the curvature radius 410 of the spring element 41 relative to the control cam pivot axis 21 is greater than the radius 450 of the pitch circle 45, at the level of which the web 46 ends.

Accordingly, the free ends 411 lie radially further out than the pitch circle 45 with respect to the control cam pivot axis 21. The running roller 42 is in this case mounted such that if theoretically the web 46 were omitted, it would roll on the pitch circle 45.

Because there is a distance on both sides of the web 46 between the free end 411 there and the respective arm 24, a receiver 49 is formed for receiving by form fit, viewed in the circumferential direction relative to the control cam pivot axis 21, a running roller 42 in the respective end position.

The spring elements 41 are here configured such that they are elastically bent by a predefined amount by the running roller 42 situated in the receiver 49. In this way, they provide a pretension force on the running roller 42 which pretensions the running roller 42 into the respective end position.

In order to move the running roller 42 out of the respective position, the control cam 20 must be moved against the pretension provided by the spring element 41. This embodiment provides a particularly secure holding of the running roller 42 or the control cam 20 in one of the end positions, since the pretension force provided by the spring element 41 on the running roller 42 is greatest in the end positions.

Optionally, as in the embodiment of FIG. 8, the running roller 42 may be mounted eccentrically to the bearing centre axis 44 and/or pretensioned against the control cam.

Figure 10:
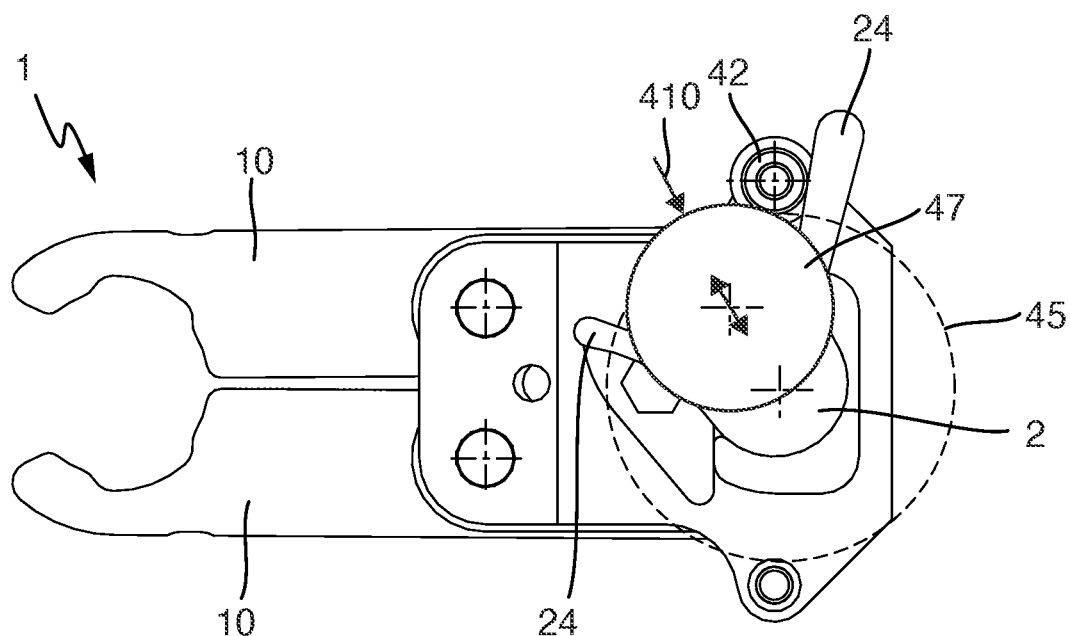
FIG. 10 shows schematically a view from below of a clamping device according to a further embodiment.

FIG. 10 shows schematically a view from below of a clamping device 1 according to a further embodiment. The clamping device 1 substantially corresponds to that of FIG. 8 with the exception of the embodiment of the pretension device 40. Instead of the spring element 41 provided as a continuous leaf spring, a bolt 47 is spring-mounted in the radial direction on the control cam 20, radially spaced from the control cam pivot axis 21. Like the embodiment in FIG. 8, the bolt 47 has a curvature, indicated by curvature radius 410, which is greater than the curvature of the pitch circle 45. Because of its spring-mounting against the running roller 42, the bolt 47 is pretensioned towards the outside in the radial direction. Accordingly, the running roller 42 is held in one of the end positions by the bolt 47.

Optionally, as in the embodiment of FIG. 8, the running roller 42 may be mounted eccentrically to the bearing centre axis 44 and/or pretensioned against the control cam.

Figure 11:
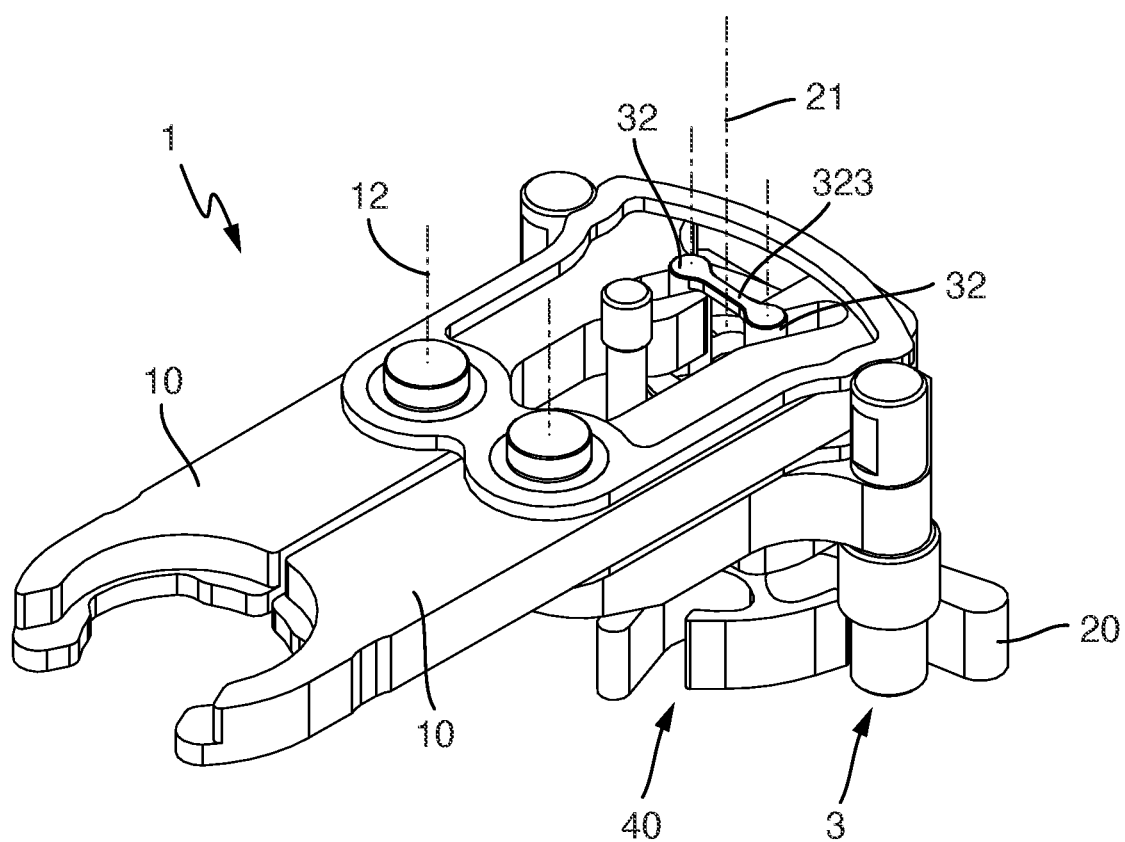
FIG. 11 shows schematically a perspective side view of a clamping device according to a further embodiment.

FIG. 11 shows schematically a perspective side view of a clamping device 1 according to a further embodiment, which substantially corresponds to that of FIG. 9.

In this embodiment, like the embodiment of FIG. 1, the control bolts 32 are configured as cylindrical pins extending parallel to the control cam pivot axis 21. At their ends above the clamping arms 10, these are connected via a locking web 323 which extends between the two control bolts 32.

The functionality of the locking web 323 corresponds to that described with reference to FIG. 6. In addition, in comparison with the embodiment in FIG. 1, it provides an increased bending stiffness of the control bolt 32 in the radial direction relative to the control cam pivot axis 21.

Figure 12:
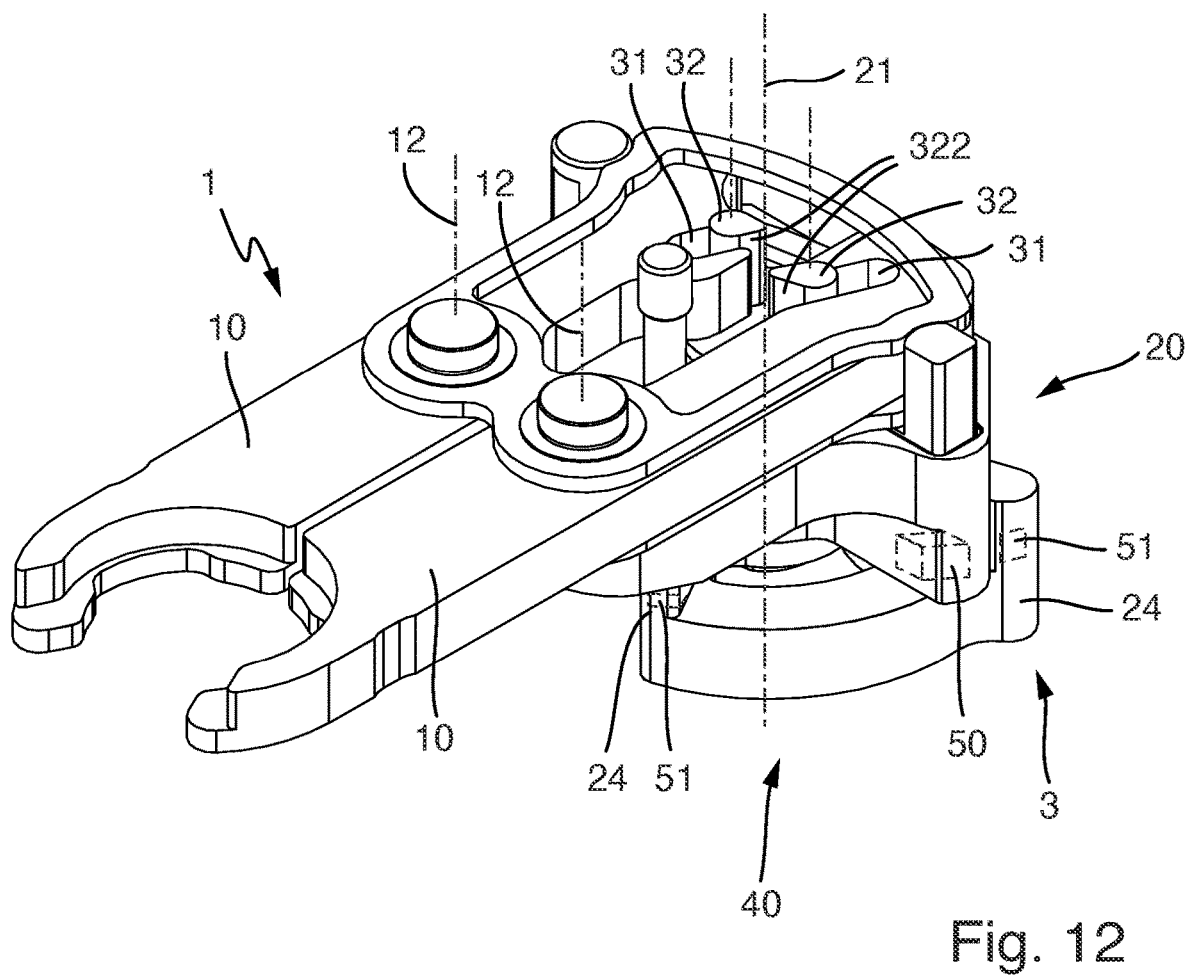
FIG. 12 shows schematically a perspective side view of a clamping device according to a further embodiment.

FIG. 12 shows schematically a perspective side view of a clamping device 1 according to a further embodiment, which substantially corresponds to that of FIG. 1.

The control bolts 32 in this embodiment, in contrast to the embodiment of FIG. 1, each have a cam portion 322 as already described with reference to the control bolt 32' from FIG. 6.

Furthermore, the pretension device 40 is configured as a magnetic pretension device 40. To this end, the stop 3 has a magnet 50 which cooperates with a magnetic element 51 provided in each of the arms 24, such that a magnetic attraction force is present between the magnet 50 and the respective magnetic element 51 when the control cam 20 is in one of the end positions. The magnetic attraction force holds the control cam 20 in the respective end position. In order to move the control cam 20 out of the respective end position, the magnetic attraction force must be overcome.

Instead of the magnetic element 51, ferromagnetic bodies may also be provided in the arms 24.

It is furthermore possible to replace the magnets 50 with a ferromagnetic material, insofar as magnetic elements 51 generating a magnetic field are present in the arms 24.

Figure 13:
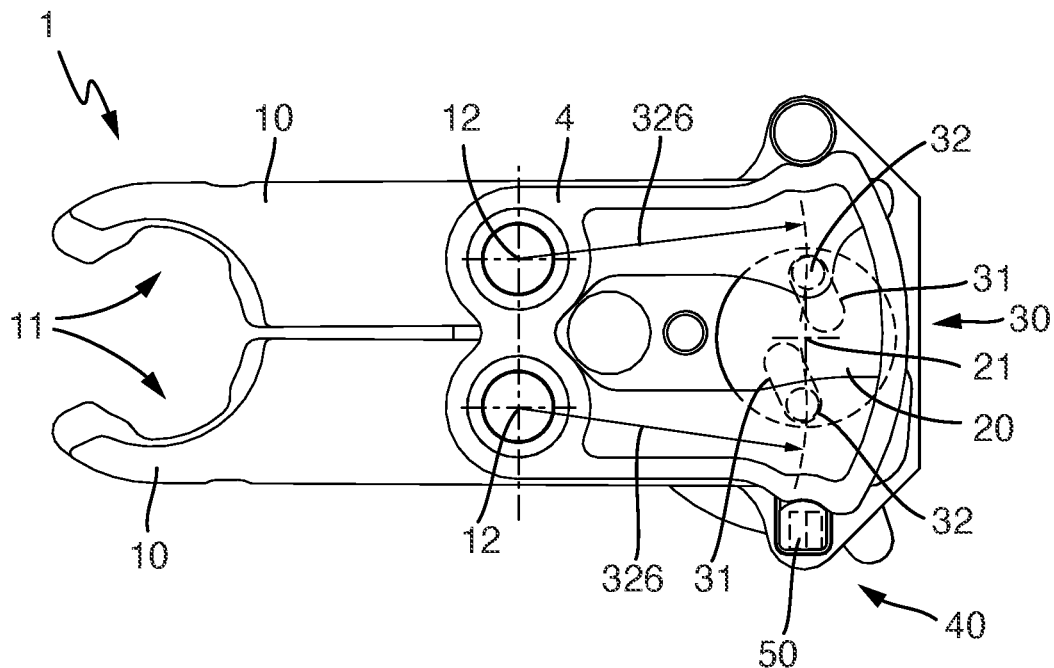
FIG. 13 shows schematically a top view of a clamping device according to a further embodiment.

FIG. 13 shows schematically a top view of a clamping device 1 according to a further embodiment, which substantially corresponds to that of FIG. 1, wherein the pretension device 40 is a magnetic pretension device according to FIG. 12.

The coupling mechanism 30 differs in that the control bolts 32 are provided on the clamping arms 10. They extend from a side of the clamping arms 10 to be regarded as the underside 13, which constitutes a side of the clamping arms 10 pointing in the direction of the control cam 20, parallel to the control cam pivot axis 21 with a predefined length in the direction of the control cam 20.

Each of the control bolts 32 is guided into a blind hole-like slotted groove 31 provided on an end face pointing in the direction of the clamping arms 10, in FIG. 13 the top side of the control cam 20.

The control bolts 32 are each arranged on their clamping arm 10 at a distance or with a radius 326 away from the pivot axis 12 of the respective clamping arm 10. In other words, they pivot about the respective pivot axis 12 on the radius 326.

Figure 14:
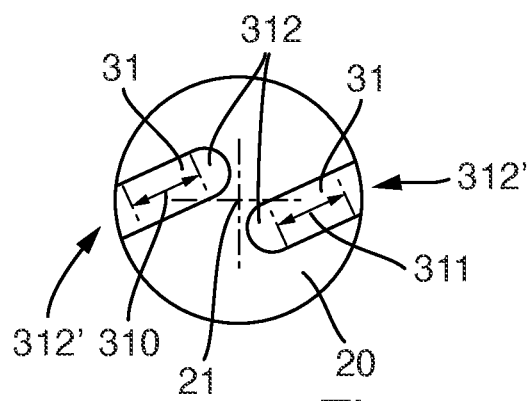
FIG. 14 shows schematically a top view of an upper part of a control cam, similar to the embodiment of FIG. 13.
Figure 15:
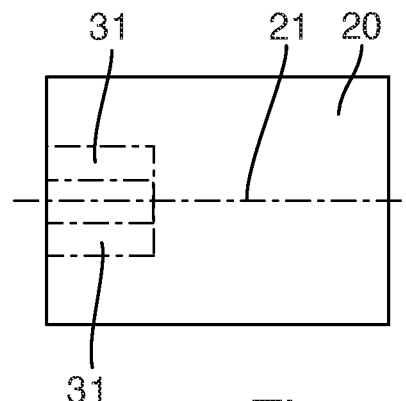
FIG. 15 shows schematically a side view of the part from FIG. 14.

FIGS. 14 and 15 show schematically a top view and a side view of an upper part of a control cam 20, similarly to the embodiment in FIG. 13, wherein in this embodiment the slotted grooves 31 are formed open at one end. In other words, the ends 312' located radially on the outside with respect to the control cam pivot axis 21, are configured as free or open ends 312'. Thus for example a cleaning fluid, which enters the slotted grooves 31 during cleaning of a container treatment device comprising the clamping device 1, can flow out of the slotted grooves 31 again at the open ends 312'.

FIG. 15 shows the embodiment of the slotted grooves 31 as blind holes.

Figure 16:
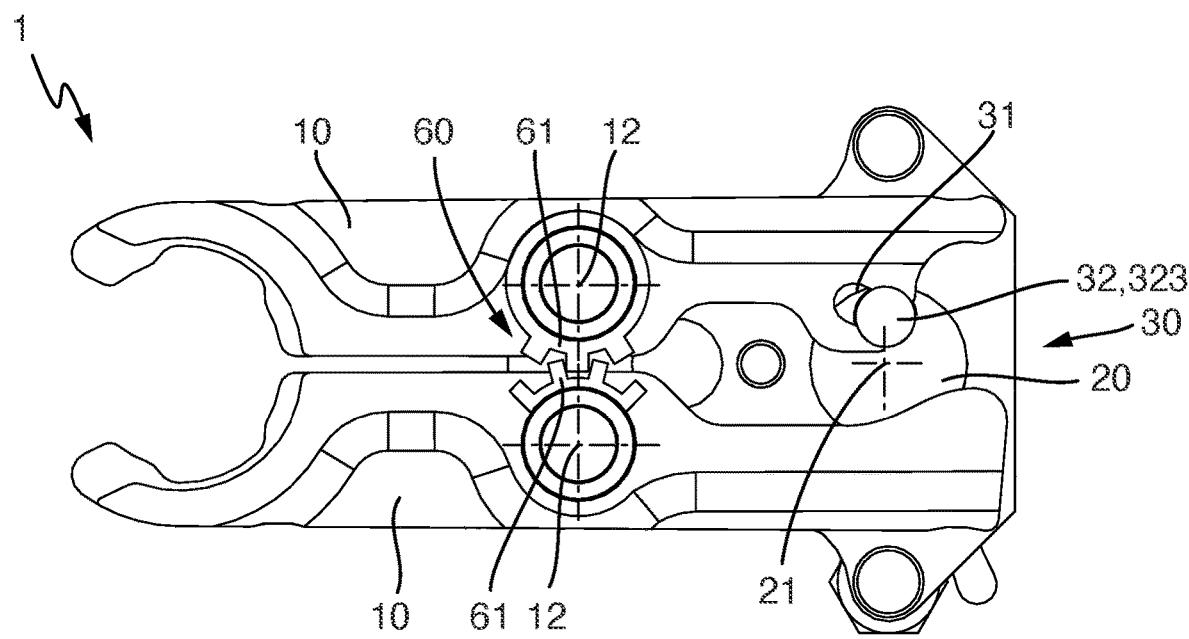
FIG. 16 shows schematically a clamping device according to a further embodiment.

FIG. 16 shows schematically a clamping device 1 according to a further embodiment. The clamping device 1 substantially corresponds to that of FIG. 1 with the following differences:

The coupling mechanism 30 comprises precisely one pair of slotted groove 31 and control bolt 32. Here, the pair of slotted groove 31 and control bolt 32 couples one of the clamping arms 10 directly to the control cam 20. This clamping arm 10 is furthermore rotationally coupled to the other clamping arm 10' via a gear mechanism 60.

In other words, the coupling mechanism 30 in this embodiment comprises the precisely one pair of slotted groove 31 and control bolt 32, for moving the first clamping arm 10 via a movement of the control cam 20, and furthermore the coupling mechanism 30 comprises a rotational coupling unit, in the present case in the form of the gear mechanism 60, for coupling the first clamping arm 10 to the second clamping arm 10' in order thus to provide an indirect coupling, via the clamping arm 10, of the second clamping arm 10' to the control cam 20.

Both clamping arms 10, 10' have a toothing portion 61 in the form of a gear wheel which is arranged substantially concentrically to the pivot axis 12 of the respective clamping arm 10, 10' and extends perpendicularly thereto. The toothing portions 61 are in engagement with one another, thereby forming the rotational coupling between the clamping arms 10, 10'.

The control bolt 32 furthermore comprises a locking web 323, similarly to the embodiment of FIG. 6.

If applicable, all individual features that are illustrated in the exemplary embodiments may be combined with one another and/or exchanged without departing from the scope of the invention.

What is claimed is:

1. A clamping device for holding a container in a container treatment device, comprising:
    two clamping arms, each clamping arm comprising a holding portion configured to hold the container; and
    a control cam pivotable about a control cam pivot axis, wherein:
    the two clamping arms and the control cam are coupled via a coupling mechanism such that a pivoting of the control cam about the control cam pivot axis causes a pivoting of the two clamping arms relative to one another,
    the coupling mechanism comprises:
        a first pair of a first slotted groove and a first control bolt guided in the first slotted groove, the first pair configured to transmit movements of the control cam to the two clamping arms, and
        a second pair of a second slotted groove and a second control bolt,
    the first pair and the second pair each couples a respective clamping arm to the control cam,
    the first slotted groove is arranged on a first clamping arm of the two clamping arms and has a first distance from a pivot axis of the first clamping arm,
    the second slotted groove is arranged on a second clamping arm of the two clamping arms and has a second distance from a pivot axis of the second clamping arm, and
    the second distance is greater than the first distance.

2. The clamping device of claim 1, wherein by pivoting of the control cam:
    the holding portions of the two clamping arms are moved into an open position and/or a closed position,
    the two clamping arms are arranged pivotably in a plane oriented perpendicularly to the control cam pivot axis, and/or
    the first clamping arm is pivotable about the pivot axis of the first clamping arm, the second clamping arm is pivotable about the pivot axis of the second clamping arm, and the pivot axis of the first clamping arm and the pivot axis of the second clamping arm are oriented parallel to the control cam pivot axis,
    wherein:
    the holding portions are arranged on one side of the two clamping arms, and
    the first pair of the first slotted groove and the first control bolt is arranged on the other side of the two clamping arms.

3. The clamping device of claim 1, wherein:
    the first slotted groove is arranged on a side of the first clamping arm and the first control bolt is arranged on the control cam, or
    the first control bolt is arranged on the side of the first clamping arm and the first slotted groove is arranged on the control cam.

4. The clamping device of claim 1, wherein:
    the first control bolt guided in the first slotted groove is arranged on the control cam with a third distance from the control cam pivot axis,
    the second control bolt guided in the second slotted groove is arranged on the control cam with a fourth distance from the control cam pivot axis, and
    the fourth distance is greater than the third distance.

5. The clamping device of claim 1, wherein the first control bolt is arranged eccentrically relative to the control cam pivot axis.

6. The clamping device of claim 1, wherein the first slotted groove is at least partially formed as a continuous bore or a blind hole bore, is formed open at one end, or is formed open at both ends.

7. The clamping device of claim 1, wherein the first control bolt has a portion that is curved relative to a longitudinal center axis of the first control bolt, and/or the first control bolt has a cam portion extending in a plane oriented perpendicularly to the control cam pivot axis.

8. The clamping device of claim 1, wherein:
    by pivoting the control cam between a predefined open position and a predefined closed position, the holding portions of the two clamping arms move by pivoting of the clamping arms relative to one another between an open position and/or a closed position, and
    the control cam is configured to be moved between the predefined open position and the predefined closed position relative to a plane perpendicular to the control cam pivot axis by a predefined angle.

9. The clamping device of claim 8, wherein the predefined angle lies in a range between 40° and 55°.

10. The clamping device of claim 8, further comprising a pretension device configured to pretension the control cam into a predefined end position corresponding to the predefined open position and/or the predefined closed position.

11. The clamping device of claim 10, wherein the pretension device comprises a spring element arranged on the control cam and a running roller in contact with the spring element, and the spring element pretensions the running roller into at least one end position.

12. The clamping device of claim 11, wherein:
the spring element comprises a curvature relative to the control cam pivot axis that is greater than a curvature of a geometric pitch circle present concentrically to the control cam pivot axis at a level of the spring element, or
the control cam comprises a web extending radially outward relative to the geometric pitch circle, from which web the spring element extends transversely to a radial direction relative to the control cam pivot axis.

13. The clamping device of claim 11, wherein:
the running roller is mounted on a bearing bolt that is arranged rotationally fixedly on a carrier plate, eccentrically to a bearing center axis of the bearing bolt,
an orientation of the bearing bolt about the bearing center axis is configured to be changed, and/or
the running roller is pretensioned onto the control cam in a radial direction with respect to the control cam pivot axis.

14. The clamping device of claim 11, wherein the spring element is configured as a curved leaf spring, in a form of a bolt spring mounted radially relative to the control cam pivot axis, or in the form of a bending bar with a free end.

15. The clamping device of claim 10, wherein:
the pretension device is configured as a magnetic pretension device, and
a stop arranged on a carrier plate comprises a magnet or a magnetizable and/or ferromagnetic material that cooperates with one magnetic element or magnetizable and/or ferromagnetic material provided on an arm of the control cam that extends radially outward relative to the control cam pivot axis, such that because of a magnetic attraction, the control cam is held in one end position.

16. The clamping device of claim 1, wherein:
at an end face viewed in a direction of the control cam pivot axis, the first control bolt comprises a locking web configured to hold the control cam on the first clamping arm, and
the locking web is in a form of a connecting web between the first control bolt and the second control bolt, or
the locking web is formed as a circular flange that is arranged concentrically to a longitudinal center axis of the first control bolt and an outer diameter of the circular flange is greater than a width of the first slotted groove transversely to its longitudinal extent.

17. A clamping device for holding a container in a container treatment device, comprising:
two clamping arms, each clamping arm comprising a holding portion configured to hold the container and each clamping arm being pivotable about a respective pivot axis; and
a control cam pivotable about a control cam pivot axis, wherein:
the two clamping arms and the control cam are coupled via a coupling mechanism such that a pivoting of the control cam about the control cam pivot axis causes a pivoting of the two clamping arms relative to one another,
the coupling mechanism comprises:
a first pair of a first slotted groove and a first control bolt guided in the first slotted groove, the first pair configured to transmit movements of the control cam to the two clamping arms, and
a second pair of a second slotted groove and a second control bolt,
the first pair and the second pair each couples a respective clamping arm to the control cam,
the first slotted groove is arranged on a first clamping arm of the two clamping arms and has a first distance from a pivot axis of the first clamping arm,
the second slotted groove is arranged on a second clamping arm of the two clamping arms and has a second distance from a pivot axis of the second clamping arm,
the second distance is greater than the first distance, and
the pivot axis of the first clamping arm and the pivot axis of the second clamping arm are oriented parallel to one another and to the control cam pivot axis.

18. A clamping device for holding a container in a container treatment device, comprising:
two clamping arms, each clamping arm comprising a holding portion configured to hold the container;
a control cam pivotable about a control cam pivot axis; and
a pretension device configured to pretension the control cam into a predefined end position corresponding to a predefined open position and/or a predefined closed position, wherein the pretension device comprises a spring element arranged on the control cam and a running roller in contact with the spring element, and the spring element pretensions the running roller into at least one end position,
wherein:
the two clamping arms and the control cam are coupled via a coupling mechanism such that a pivoting of the control cam about the control cam pivot axis causes a pivoting of the two clamping arms relative to one another,
the coupling mechanism comprises a pair of a slotted groove and a control bolt guided in the slotted groove, the pair configured to transmit movements of the control cam to the two clamping arms,
by pivoting the control cam between the predefined open position and the predefined closed position, the holding portions of the two clamping arms move by pivoting of the clamping arms relative to one another between an open position and/or a closed position, and
the control cam is configured to be moved between the predefined open position and the predefined closed position relative to a plane perpendicular to the control cam pivot axis by a predefined angle.

19. The clamping device of claim 18, wherein:
the spring element comprises a curvature relative to the control cam pivot axis that is greater than a curvature of a geometric pitch circle present concentrically to the control cam pivot axis at a level of the spring element, or
the control cam comprises a web extending radially outward relative to the geometric pitch circle, from which web the spring element extends transversely to a radial direction relative to the control cam pivot axis.

20. The clamping device of claim 18, wherein:
the running roller is mounted on a bearing bolt that is arranged rotationally fixedly on a carrier plate, eccentrically to a bearing center axis of the bearing bolt,
an orientation of the bearing bolt about the bearing center axis is configured to be changed, and/or
the running roller is pretensioned onto the control cam in a radial direction with respect to the control cam pivot axis.

* * * * *